United States Patent
Reichl et al.

(10) Patent No.: US 6,611,790 B1
(45) Date of Patent: Aug. 26, 2003

(54) MEASURING DEVICE FOR THE CONTACTLESS MEASUREMENT OF AN ANGLE OF ROTATION

(75) Inventors: Asta Reichl, Stuttgart (DE); Thomas Klotzbuecher, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/856,062

(22) PCT Filed: Sep. 22, 1999

(86) PCT No.: PCT/DE99/03021

§ 371 (c)(1),
(2), (4) Date: May 17, 2001

(87) PCT Pub. No.: WO00/29813

PCT Pub. Date: May 25, 2000

(30) Foreign Application Priority Data

Nov. 17, 1998 (DE) ......................................... 198 52 915

(51) Int. Cl.⁷ ................................................. G01B 7/30
(52) U.S. Cl. ................ 702/163; 324/207.2; 324/207.21
(58) Field of Search ..................... 702/163; 324/207.21, 324/207.25, 207.22, 207.24; 341/15

(56) References Cited

U.S. PATENT DOCUMENTS 6,137,288 A * 10/2000 Luetzow .................. 324/207.2

FOREIGN PATENT DOCUMENTS

| CA | 1 232 957 A | 2/1988 |
| DE | 41 03 561 A1 | 8/1991 |
| DE | 41 23 131 A1 | 1/1993 |
| DE | 197 19 019 A1 | 11/1997 |
| DE | 196 34 281 A1 | 2/1998 |
| DE | 196 34 282 A1 | 2/1998 |
| DE | 197 31 555 A1 | 4/1998 |
| DE | 197 53 776 A | 6/1999 |
| EP | 0 611 951 A | 8/1994 |

\* cited by examiner

Primary Examiner—Kamini Shah
(74) Attorney, Agent, or Firm—Michael J. Striker

(57) ABSTRACT

A measuring instrument for contactless detection of an angle of rotation γ is comprised of a supporting plate (14) made of soft magnetic material, which serves as a rotor. Two segments (16, 17) that are separated by a slot (21) and a spacing gap (22) are disposed in a plane in relation to the supporting plate (14). The supporting plate (14) is attached to the axle (11), whose projection (12) or the axle (11) itself is comprised of magnetically conductive material. The supporting plate (14) has a magnet (15) disposed on it, which is embodied as smaller than the angle of rotation γ to be measured. The magnet (15) can be embodied of one or several parts. Through the disposition of the magnet (15), it is possible to produce different sections in the measurement curve detected by the measurement instrument, e.g. plateaus or sections which deviate from the linear measurement line.

21 Claims, 7 Drawing Sheets

MEASURING DEVICE FOR THE CONTACTLESS MEASUREMENT OF AN ANGLE OF ROTATION

PRIOR ART

The invention is based on a measuring instrument for contactless detection of an angle of rotation. DE-OS 196 34 281.3 has disclosed a sensor which is disposed in three superposed planes. The rotor constitutes the middle plane, wherein it is comprised of the supporting plate for a permanent magnet. The supporting plate itself is comprised of magnetically nonconductive material so that the magnetic flux travels via the two other planes, i.e. the stator, and is dispersed with the aid of two spacers which are disposed between the two planes of the stator. The shaft or the projections of a shaft that is attached to the rotor has no influence on the magnetic flux. With the sensor, a relatively large angular range can in fact be measured without a change of sign, but it is relatively large in terms of the axial direction due to being constructed of three parallel planes.

Furthermore, in potentiometers, it is known to produce a broken measurement line by subdividing the contact paths in the vicinity of the flattening.

ADVANTAGES OF THE INVENTION

The measuring instrument for contactless detection of an angle of rotation according to the invention has the advantage over the prior art that the sensor has a relatively small size in the axial direction. It is comprised of only two planes. The supporting plates of the permanent magnet which represents the rotor is simultaneously also used to convey the magnetic flux. Furthermore, the shaft or axle supporting the rotor is included in the conduction of the magnetic flux, as a result of which additional magnetic flux conducting parts are rendered unnecessary. Furthermore, this design reduces the number of parts and the assembly costs involved with them.

By varying the length of the magnet or dividing it into individual sections, it is simple to produce a measurement curve with one or more flattenings.

Due to its simple design, the sensor can be integrated with a relatively low assembly cost into various systems, e.g. a throttle measurement device, a pedal module for a gas pedal-travel sensor or can be used as an independent sensor in throttle valve transmitters or a body spring compression device.

BRIEF DESCRIPTION OF THE DRAWINGS

FIGS. 1 to 4 show different views of or sections through a first exemplary embodiment.

FIGS. 12 to 23 show other exemplary embodiments, wherein

DESCRIPTION OF THE PREFERRED EMBODIMENTS

In FIGS. 1 to 4, a sensor is labeled 10, which with the aid of an axle 11, is connected to a component, not shown, whose rotational movement is to be determined. A projection 12 is attached to the end face of the axle 11 so that a shoulder 13 is produced on which a supporting plate 14 is centrally placed, which simultaneously serves as a rotor. The axle 11, the projection 12, and the supporting plate 14 can be embodied both as separate components and as a single component. An annular permanent magnet 15 is disposed on the supporting plate 14 with the greatest possible radial distance from the center point, i.e. from the attachment point of the axle 11. The greater this distance, the better the resolution of the measurement signal. The permanent magnet 15 can be embodied as a sector of a circle (circle segment) or part of a circular ring. Its angular range $\alpha$, however, is smaller than the to-be-determined maximal angle of rotation $\gamma$ of the component to be monitored and measured. As can be seen from the depictions in FIGS. 2 and 3, the angular range $\alpha$ of the permanent magnet 15 in this exemplary embodiment is approx. 100 degrees; the total working measurement range, however, is $\gamma$=180 degrees. The differential angle $\beta$ would create the plateau P shown in FIG. 11. The permanent magnet 15 is furthermore polarized in the axial direction, i.e. perpendicular to the supporting plate 12. The supporting plate 14 is comprised of magnetically conductive, in particular soft magnetic material. According to the invention, the axle 11 and the projection 12 or at least the projection 12 is comprised of magnetically conductive, in particular soft magnetic material.

Figure 1:
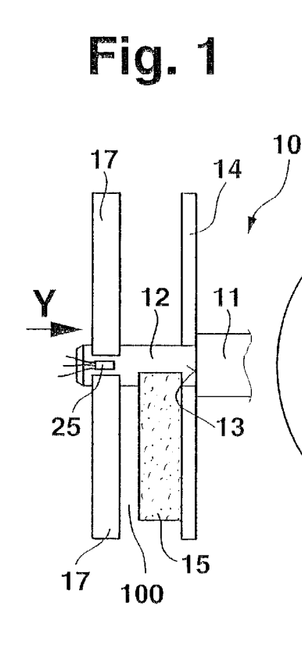
FIG. 1 is a longitudinal section in the direction X according to FIG. 3.
Figure 2:
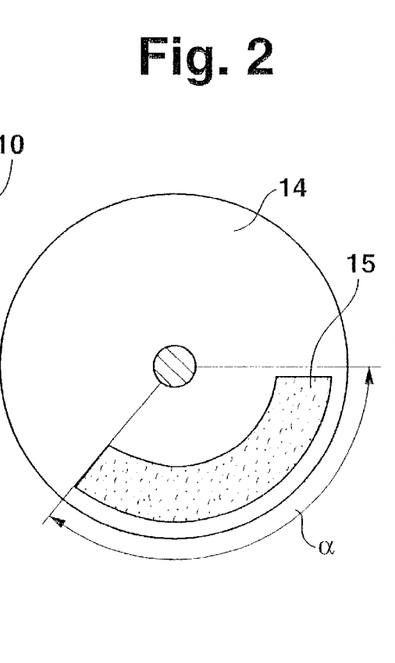
FIG. 2 shows a section B—B according to FIG. 4.
Figure 3:
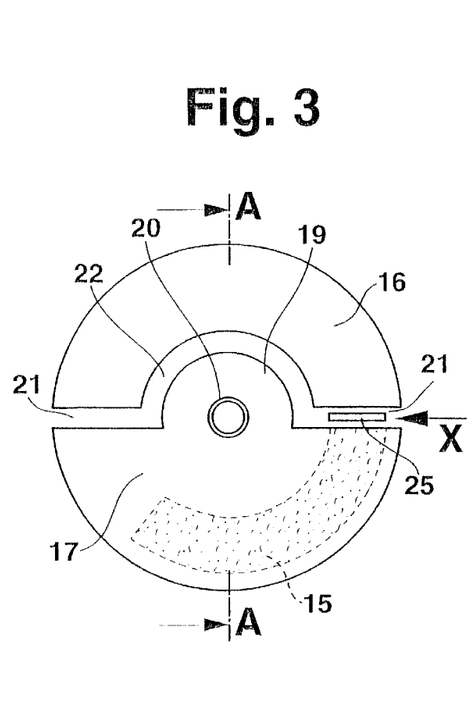
FIG. 3 shows a top view in the direction Y according to FIG. 1.
Figure 4:
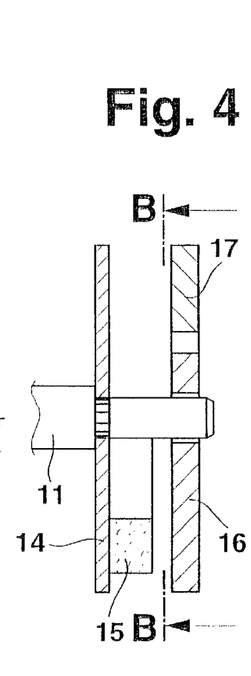
FIG. 4 is a longitudinal section in the direction A—A according to FIG. 3.

In a second plane above the permanent magnet 15, a stator, which is comprised of two segments 16, 17, is disposed parallel to and spaced slightly apart from the supporting plate 14. In so doing, the segment 16 encompasses the projection 12 with an arc 19. In this exemplary embodiment, the arc 19 is embodied as an arc of a circle. However, a different contour is also conceivable. The essential thing, however, is that a magnetically conductive connection be possible between the projection 12 and the segment 16. The gap 20 between the axle 11 and the arc 19 must therefore be embodied as small as possible. A continuous gap is embodied between the two segments 16, 17 and in the exemplary embodiment according to FIGS. 1 to 4, has two identically embodied outer sections 21 and a central spacing gap 22 disposed in the vicinity of the arc 19. With regard to the spacing gap 22, it is important that as close as possible to none of the magnetic flux produced by the permanent magnet 15 is possible between the segments 16 and 17, i.e. in this exemplary embodiment, in the vicinity of the arc 19. The spacing gap 22 can therefore be filled with air or with another magnetically nonconductive material. If the spacing gap 22 is filled with air, for example, then it must be embodied as larger than the gap 21 in order to achieve this above-mentioned effect. Instead of air, a different magnetically nonconductive material can also be selected. The gap 21 and the spacing gap can also be filled with different materials. A magnetic field-sensitive element 25, such as a Hall-effect digital switch, a magnetic transistor, coils, magnetoresistive element, or a Hall element, is disposed in at least one of the gaps 21, approximately in the middle. In this connection, it is important that the magnetic field-sensitive component has as linear as possible a dependency of its output signal on the magnetic induction B. In FIGS. 1 to 4, a respective measurement is depicted with the aid of a single magnetic field-sensitive element 25, in this instance a Hall element. In this instance, the element 25 must be disposed as close as possible to the middle in the gap 21. However, it would also be possible, for example, to dispose a respective element 25 in each of the two gaps 21 in order, for example, to be able to execute a so-called redundant measurement (safety measurement). It would also be conceivable to dispose two elements in one gap. If one magnetic field-sensitive element 25 is disposed in only one gap 21, as shown in FIG. 3, then the opposite gap 21 can also be the size of the spacing gap 22 and consequently have the magnetically nonconductive function of the spacing gap 22.

Figure 5:
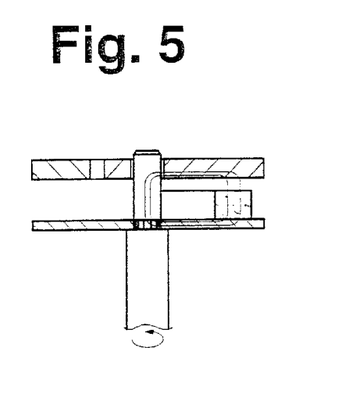
FIGS. 5 and 6 show the magnetic flux with an angular rotation of zero degrees and an induction of B=zero.
Figure 6:
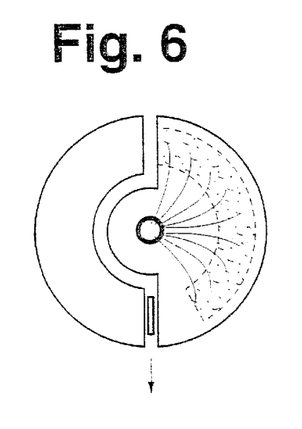
Figure 7:
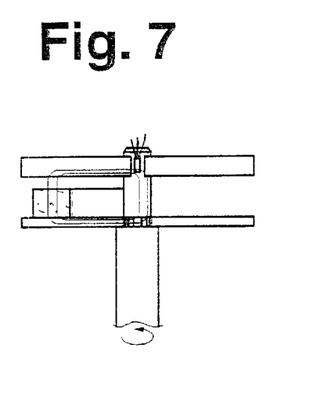
FIGS. 7 and 8 show the corresponding magnetic flux with an angular rotation $\alpha$ and an induction of B=Max.
Figure 8:
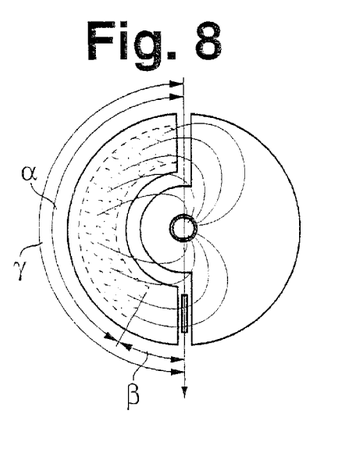
Figure 9:
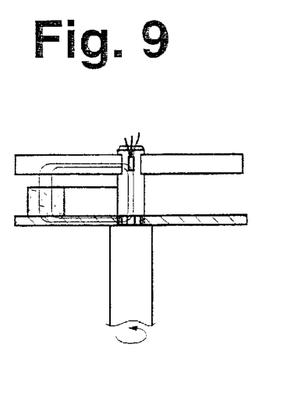
FIGS. 9 and 10 show the magnetic flux in the angular range $\beta$ and in the plateau region with an induction of B=Max.
Figure 10:
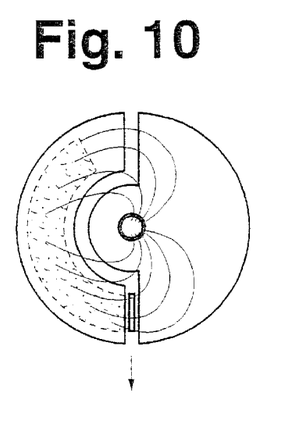
Figure 11:
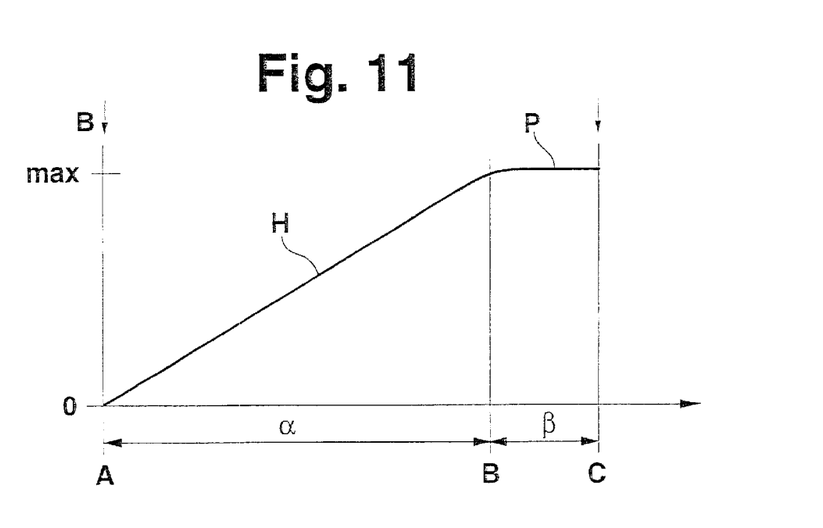
FIG. 11 shows the corresponding curve of the induction B over the total angle of rotation $\gamma$ ($\gamma=\alpha+\beta$).
Figures 12, 13:
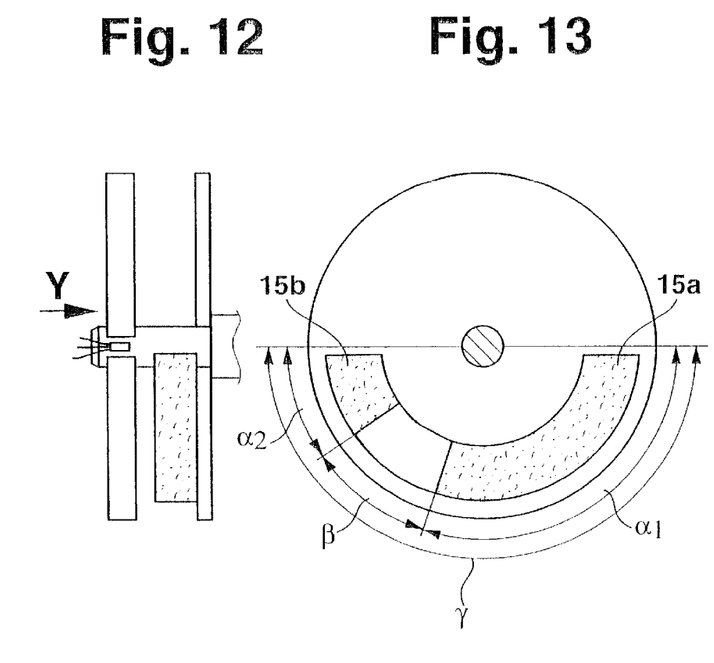
FIGS. 12 to 15 show an embodiment with a two-part magnet.
Figure 14:
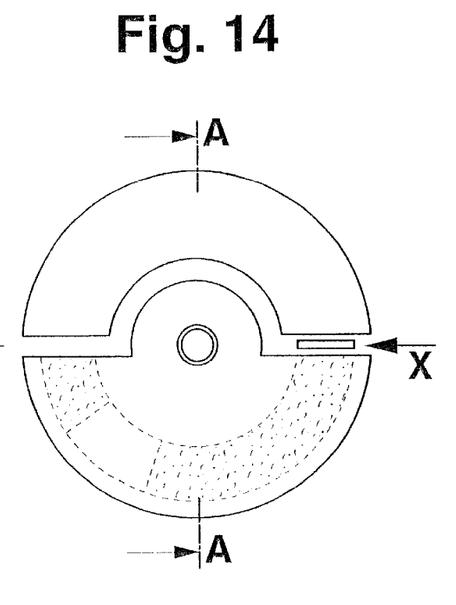
Figure 15:
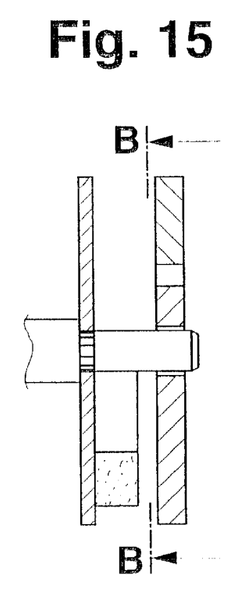
Figure 16:
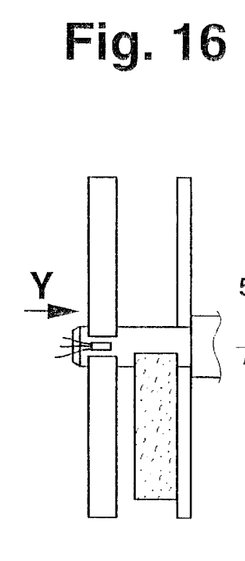
FIGS. 16 to 19 show a magnet with a first slotted form.

FIG. 11 shows the course of the characteristic curve of the magnetic induction B in the element 25, e.g. a Hall element, over the angle of rotation γ of the axle 11. It is clear that with an angle of rotation γ of 0°, the induction B is likewise 0, while at the maximal angle of rotation γ=max, the maximal induction value is also achieved. In this exemplary embodiment, the maximal angle of rotation γ is reached at 180°. The position of the sensor 10 with an angle of rotation of 0° is shown in FIGS. 5 and 6. It is clear that the magnetic flux travels from the permanent magnet 15, via the air gap 100 to the segment 17, from there via the slight gap 20, which allows the rotor to move in relation to the stator, to the projection 12 and from there, via the supporting plate 14, back to the permanent magnet 15. As can be seen in particular in FIG. 6, the magnetic flux is controlled so that with an angle of rotation of 0°, it does not travel through the element 25 so that no magnetic induction B can occur in the element 25. If the axle 11 and hence the supporting plate 14 with the permanent magnet 15 is now rotated, then the magnetic flux traveling through the element 25 is increased and the linear measurement line H shown in FIG. 11 is produced. In FIGS. 5 to 10, it should be noted that the rotor is moving counterclockwise. At the end of the measurement line H, i.e. at point B, the permanent magnet 15 has just passed completely through the gap 21. It also indicates that the permanent magnet 15 is now disposed completely underneath the segment 16. This position B at the angle of rotation α also represents the position of the maximal magnetic flux of the permanent magnet 15 via the gap 21. With further rotation by the angular range β in order to achieve the total rotation range γ no change in the induction B occurs in the measurement gap 21 and consequently in the measurement element 25. As a result, a plateau region P is produced in the graph according to FIG. 11. FIGS. 9 and 10 show the end position at point C after the further rotation by the angle β, i.e. after the total rotation range γ. It is clear, particularly from FIGS. 8 and the gap 21, nearly the entire magnetic flux is conveyed through the element 25 and as a result, a maximal possible magnetic induction B is produced in the element 25. Furthermore, it is also clear from these two FIGS. 8 and 10 that the spacing gap 22 causes nearly all of the magnetic lines to travel via the gap 21 and consequently through the element 25. This means that as close as possible to no magnetic flux can travel through the spacing gap 22.

Figure 30:
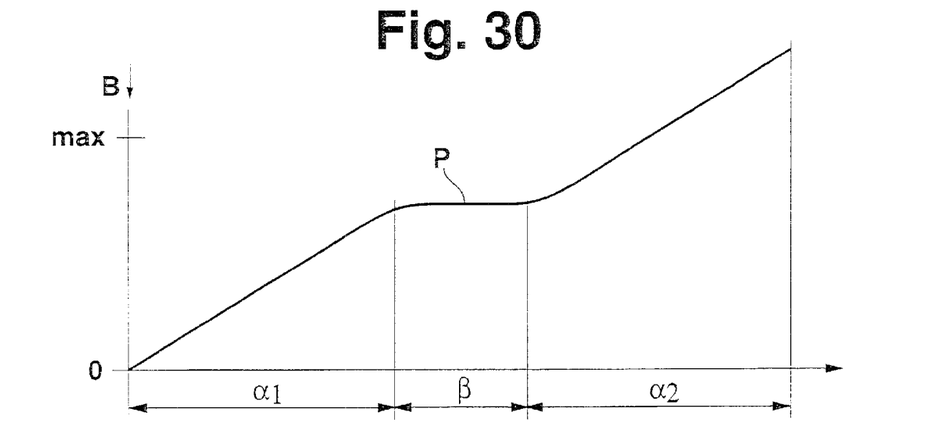

It is essential to the invention that the permanent magnet 15 is smaller than the entire measurement range γ and is smaller than the segment 17 serving as a flux conducting part. In the preceding exemplary embodiments, the permanent magnet 15 was embodied of one piece and was disposed on the support 14 so that the beginning of the permanent magnet was also disposed at the beginning of the rotation range. In the exemplary embodiment according to FIGS. 12 to 15, the permanent magnet is now embodied of two parts. This two-part design shifts the plateau region P, which corresponds to the rotation range β of the sensor 10, between two linearly extending curve sections (FIG. 30). The two annular or segment-shaped permanent magnet parts 15a and 15b can be of different sizes or of the same size. The two parts are magnetized in the same direction. Because the measurement range β is now disposed between the two permanent magnet parts 15a and 15b, the plateau region P is shifted into the course of the measurement line A so that a characteristic curve is produced that is analogous to the one in FIG. 30. FIG. 30 shows a characteristic curve in which the two permanent magnet parts 15a and 15b were the same size. Furthermore, it would also be possible for there to be more than two permanent magnet parts, i.e. three, four, etc. It would therefore be possible to produce a correspondingly desired number of plateaus in the measurement line. Instead of a permanent magnet, it would also be possible to also produce magnetized regions on the supporting plate. This embodiment could be used for all of the exemplary embodiments mentioned here. Controls can be carried out with the aid of the plateau(s) or sections that deviate from the actual measurement curve.

Figure 17:
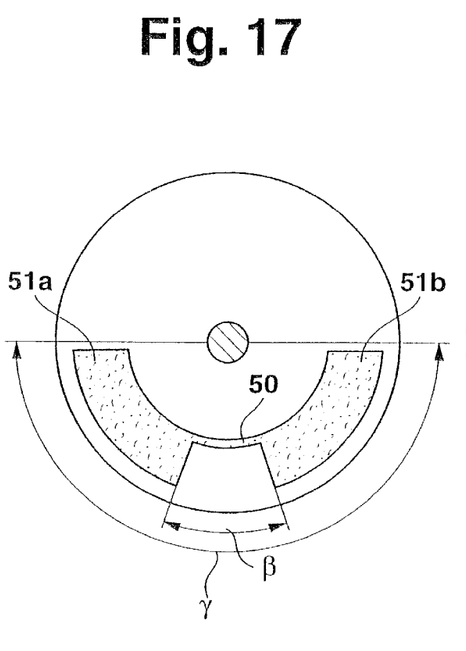
Figure 18:
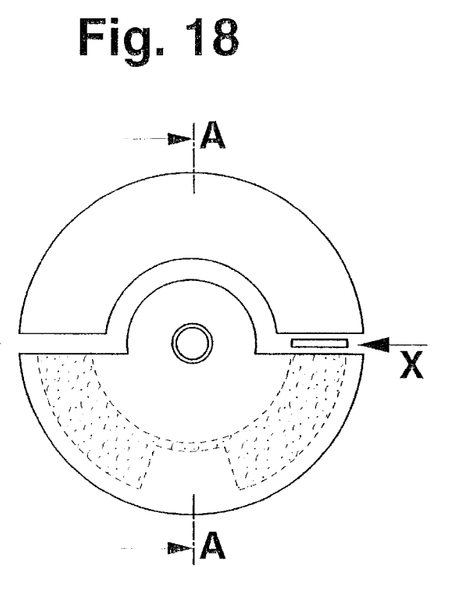
Figure 19:
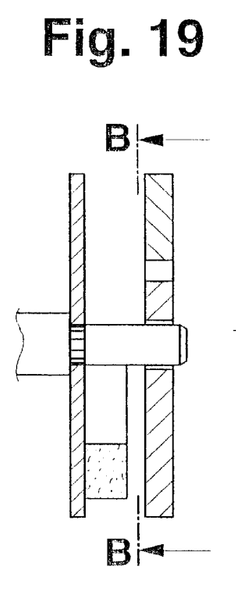

While in the preceding exemplary embodiments, there is a separation of the two permanent magnet parts 15a and 15b, the parts can also be connected to each other by a small intermediary piece. A corresponding exemplary embodiment is shown in FIGS. 16 to 19. In FIG. 17, the intermediary piece 50 is disposed on the inside, i.e. it connects the inner radius of the two permanent magnet pieces 51a and 51b to each other. Naturally, it would also be possible to dispose the connecting piece 50 at the outer edge or in the middle. Because of this connecting piece 50, the measurement curve in the vicinity of the angle of rotation β no longer extends flat as a plateau, as in the preceding exemplary embodiments and as shown in FIG. 11, but depending on the width of the connecting piece 50, this region of the graph has a rise in the rotation range β. The rise can be influenced by the dimension, in particular the radial width. This means that it is also possible for there to be an intermediary piece that is wider than the permanent magnet parts and consequently a steeper course of the curve can be achieved in this region than in the vicinity of the permanent magnet parts.

Figure 20:
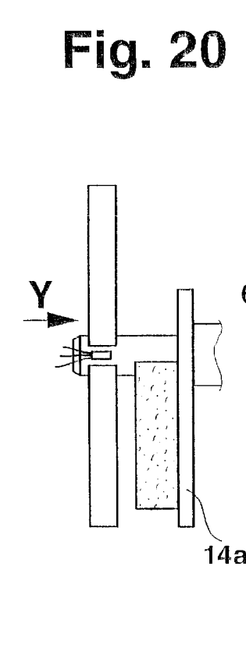
FIGS. 20 to 23 show a two-part magnet with a slot in the support.
Figure 21:
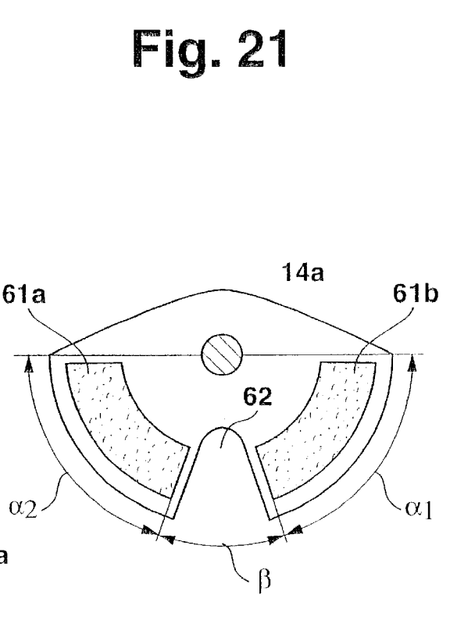
Figure 22:
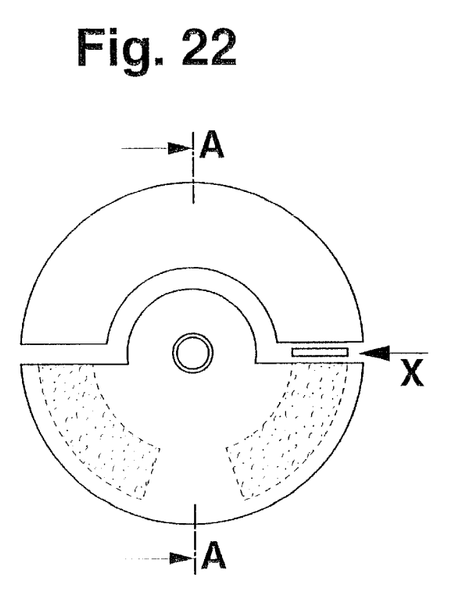
Figure 23:
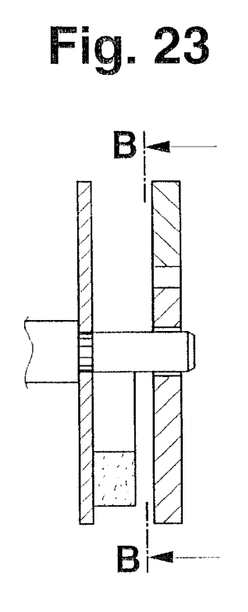

The exemplary embodiment in FIGS. 20 to 23 likewise has a two-part permanent magnet as shown in a similar fashion in FIGS. 12 to 15. The two permanent magnet parts 61a and 61b here are the same size, i.e. have the same angular range. This means that the angular range α1=α2. The two permanent magnet parts 61a and 61b are disposed so that the angular range β is disposed between the two parts. In addition, a slot is also embodied in the support 14 in the region β. This slot 62 serves to achieve a relatively sharp transition between the linearly extending characteristic curve and the plateau region P in the measurement range β. FIGS. 21 and 20 also show that the supporting plate 14a does not have to be an entire disk, but serves only as a supporting surface for the permanent magnet parts 61a and 61b and for fastening as a rotor to the axle 11 or its projection 12.

Figure 24:
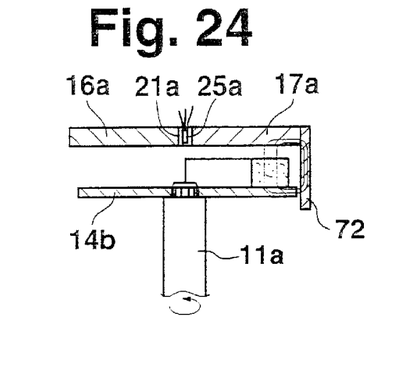
FIGS. 24 to 30 show the magnetic flux curve over the angle of rotation.
Figure 25:
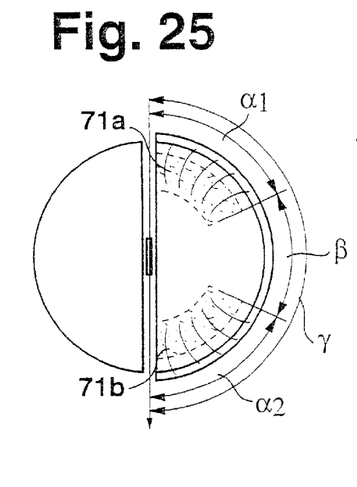
Figure 26:
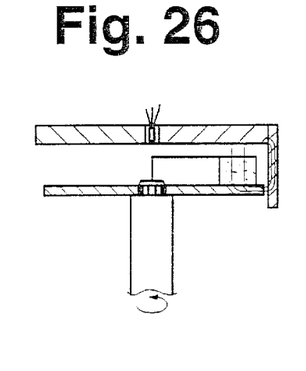
Figure 27:
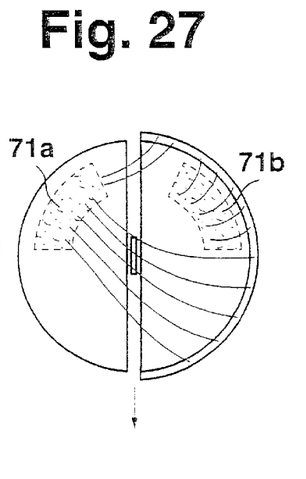
Figure 28:
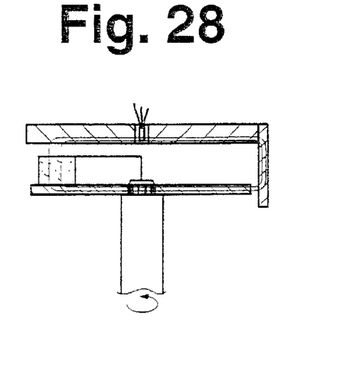
Figure 29:
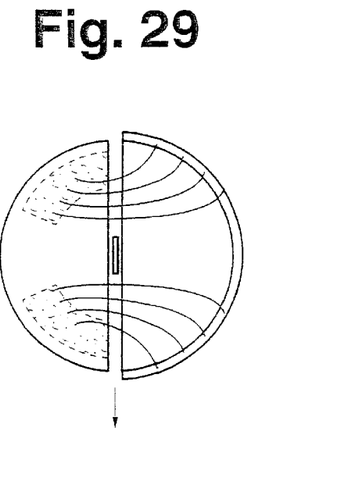

Whereas a magnetic flux in the preceding exemplary embodiments was controlled via the magnetically conductive projection 2 of the axle 11, in FIGS. 24 to 29 and in the corresponding graph 30, an embodiment of a sensor 70 is shown in which the magnetic flux does not travel via the axle and/or a projection of the axle, but rather is controlled via a return flux part 72 attached to a segment 17a of the stator that functions as a flux conducting part. It is clear in FIG. 24 that a support 14b is disposed on the axle 11a and has the same properties as the support 14 or 14a in the preceding exemplary embodiments. In a second plane above supporting plate 14b, which serves as a rotor, there is a stator which is comprised of two segments 16a and 17a. A magnetic field-sensitive element 25a is disposed in the slot 21a between the two segments 16a and 17a. An element of the kind described in the other exemplary embodiments can be used as the magnetic field-sensitive element 25a. A return flux part 72 is disposed on the segment 17a and encompasses the entire circular circumference surface of the segment 17a. It has a length that protrudes beyond the supporting plate 14b. Like the two segments 16a and 17a, it is made of magnetically conductive material. It is also clear from FIG. 25 that the permanent magnet disposed on the supporting plate 14b is comprised of two parts 71a and 71b. The two parts 71a and 71b are of the same size, which means that the angular range α1=α2. The measurement range β is once again disposed between the two permanent magnet parts 71a and 71b. FIGS. 24 and 25 now show the position with an angle of rotation γ=0° and an induction B=0. With counterclockwise rotation of the axle 11a and consequently of the supporting plate 14b, the first magnet part 71a is moved across the gap 21a and is disposed to an ever increasing degree in the vicinity of the segment 16a. FIGS. 26 and 27 now show the position when the measurement range β is disposed over the gap 21a. As long as the magnet part 71a is moving underneath the segment 16a, the characteristic curve rises in linear fashion as shown in FIG. 30. As soon as the entire permanent magnet part 71a has passed the gap 21a, the plateau P begins, which corresponds to the measurement range β. As soon as the magnet part 71b begins to move under the segment 16a, the measurement line rises again in linear fashion and reaches the maximal induction B=max as soon as the permanent magnet part 71b, i.e. both permanent magnet parts 71a and 71b, are disposed completely underneath the segment 16a. FIGS. 28 and 29 then show the position of the sensor 70 with a maximal angle of rotation position γ=max and a maximal induction B=max.

The measurement line in FIG. 30 has therefore two different rising slopes (it does not change sign).

The sensors described in the exemplary embodiments are suited, for example, for installation in a throttle valve adjusting unit. This unit assists in detecting the angle of rotation of a throttle valve for a motor control. In this connection, the segments 16, 17 of the stator can be installed directly in the cover of the throttle valve adjusting unit. Since the cover is comprised of plastic, the segments 16, 17 can be injection molded into the cover. The two segments 16, 17 of the stator could also possibly be clipped into the cover.

Figure 31:
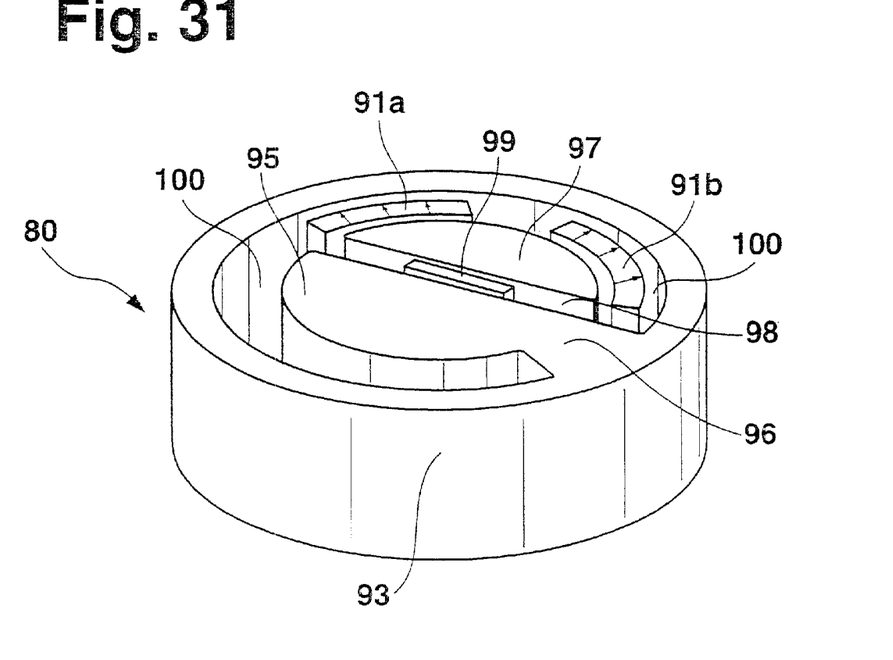
FIGS. 31 and 32 show an embodiment with a radially magnetized magnet.
Figure 32:
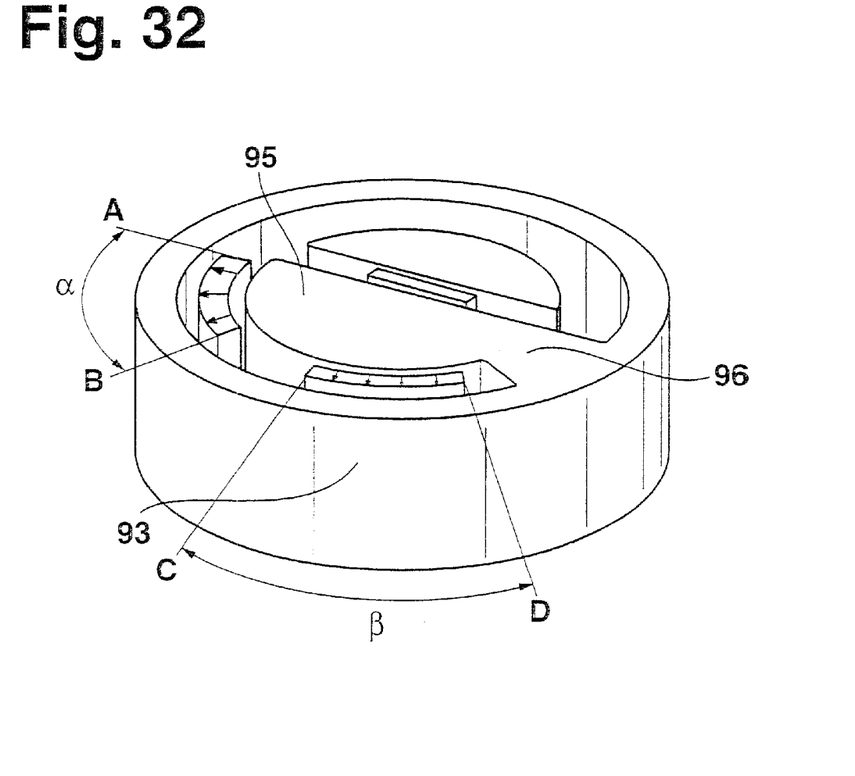

FIGS. 31 and 32 now show an embodiment of an angle sensor 80 in which the permanent magnet or the permanent magnet parts are magnetized in the radial direction. In the angle sensor 80, one of the segments 95 is connected by means of a bridge 96 to an outer annular housing part 93. The second segment element 97 has no connection to the housing part 93, i.e. there is no magnetically conductive connection between the segment 97 and the housing part 93. Because of the bridge 96, the angular range to be determined is consequently limited, i.e. it is not possible to take measurements over an angle of approximately 200°. In this embodiment, the segment 95, the bridge 96, and the housing part 93 can advantageously be produced as a one-piece component made of soft magnetic material, e.g. stacked transformer plates or sintered material. Naturally, it is also possible here to embody the segments 95, 97 not only symmetrically but also asymmetrically. The magnetic field-sensitive element 99, which can be embodied the same way as in the above-described exemplary embodiments, is disposed in the slot 98 between the two segments 95 and 97. In the depiction according to FIG. 31, the permanent magnet 91a, 91b disposed in the slot 100 embraces the segment 97. This means that the permanent magnet in turn is comprised of at least two permanent magnet parts 91a and 91b or of a single permanent magnet which embraces an angular range smaller than the segment 97. The polarization direction of the permanent magnet or the two permanent magnet parts is oriented in the radial direction. This means that the magnetization direction is directed from the segment 97 toward the housing part 93 or in the opposite direction. FIGS. 31 and 32 do not show that the permanent magnet or the two permanent magnet parts 91a and 91b are in turn disposed on a supporting plate which is connected to the rotating axle. In this connection, FIG. 31 shows the position of the permanent magnet with an angle of rotation γ=0 and FIG. 32 shows the position with a maximal angle of rotation γ=max. The measurement line produced during the rotating motion corresponds analogously to the characteristic curve shown in FIG. 30.

What is claimed is:

1. A measuring instrument for contactless determination of rotational movement of a component, comprising a rotor connectable with a component; a stator rotatable relative to said rotor with an air gap between said stator and said rotor, said stator being composed of at least two segments which are separated by a magnetically non conductive gap; a magnet arranged on said rotor, at least one magnetic field-sensitive element disposed in said magnetically non conductive gap, at least one part of said stator having a magnetically conductive connection to said rotor, said rotor being composed of a magnetically conductive material, said magnet being smaller than an angle of rotation between said stator and said rotor to be measured so that there are two different exclusively ascending slopes in a measuring curve which does not have a change of sign.

2. A measuring instrument as defined in claim 1, wherein said magnet is composed of a number of parts which are separated by a section of non magnetic material.

3. A measuring instrument as defined in claim 1, and further comprising at least one return flux part which protrudes beyond said rotor and is disposed in one of said segments.

4. A measuring instrument as defined in claim 1, and further comprising at least one return flux part arranged on one of said segments, said rotor protruding beyond said return flux part.

5. A measuring instrument as defined in claim 1, wherein said rotor has an axle with at least one region of magnetically conductive material extending from said rotor to a part of said stator which has a magnetically conductive connection to said rotor, one of said magnetically non conductive gaps impeding a magnetic flux of said magnet and controlling it so that it travels via at least the other of said magnetically non conductive gaps, said one magnetically non conductive gap being larger than said other magnetically non conductive gap.

6. A measuring instrument as defined in claim 5, wherein said at least one region of said axle and also said rotor are composed of soft magnetic material.

7. A measuring instrument as defined in claim 5, wherein said stator has a part with a projection into which said at least one region of said axle protrudes.

8. A measuring instrument for contactless determination of rotational movement of a component, comprising a rotor connectable to a component; a stator which is composed of a magnetically conductive material and is located relative to the rotor so that an angle of rotation between a stator and a rotor is to be detected, said stator and said rotor having an air gap therebetween, said stator also having at least one air gap; at least one magnetic field-sensitive element located in said at least one air gap of said rotor; at least one magnet having at least one portion arranged in said rotor, said stator being composed of a plurality of parts, one of said parts having no magnetically conductive connection to the remaining parts so that a division of a magnetic flux of said magnet takes place, so that at least a first part of the magnetic flux flows through said magnetic field-sensitive element, said magnet being smaller than an angle of rotation to be measured between said rotor and said stator, so that there are two different exclusively ascending slopes in a measuring curve which does not have a change of sign.

9. A measuring instrument as defined in claim 8, wherein said magnet is composed of a number of parts which are separated by a section of non magnetic material.

10. A measuring instrument as defined in claim 8, and further comprising at least one return flux part which protrudes beyond said rotor and is disposed in one of said segments.

11. A measuring instrument as defined in claim 8, and further comprising at least one return flux part arranged on one of said segments, said rotor protruding beyond said return flux part.

12. A measuring instrument as defined in claim 8, wherein said rotor has an axle with at least one region of magnetically conductive material extending from said rotor to a part of said stator which has a magnetically conductive connection to said rotor, one of said magnetically non conductive gaps impeding a magnetic flux of said magnet and controlling it so that it travels via at least the other of said magnetically non conductive gaps, said one magnetically non conductive gap being larger than said other magnetically non conductive gap.

13. A measuring instrument as defined in claim 8, wherein said at least one region of said axle and also said rotor are composed of soft magnetic material.

14. A measuring instrument as defined in claim 8, wherein said stator has a part with a projection into which said at least one region of said axle protrudes.

15. A measuring instrument for contactless determination of rotational movement of a component, comprising a stator; a rotor rotatable relative to said stator and whose angle of rotation relative to said stator is to be detected, so that an air gap is provided between said stator and said rotor; a magnet arranged on said rotor, said stator being composed of at least two segments which are separated by a magnetically non conductive gap; at least one magnetic field-sensitive element arranged in said magnetically non conductive gap, at least a part of said stator having a magnetically conductive connection to said rotor, said rotor being composed of a magnetically conductive material, said magnet being composed of a plurality of parts, at least two parts of said magnet being connected to each other via an intermediate piece, so that there are at least two different exclusively ascending slopes in the measuring curve, which does not have a change of sign.

16. A measuring instrument as defined in claim 15, and further comprising at least one return flux part which protrudes beyond said rotor and is disposed in one of said segments.

17. A measuring instrument as defined in claim 15, and further comprising at least one return flux part arranged on one of said segments, said rotor protruding beyond said return flux part.

18. A measuring instrument as defined in claim 15, wherein said rotor has an axle with at least one region of magnetically conductive material extending from said rotor to a part of said stator which has a magnetically conductive connection to said rotor, one of said magnetically non conductive gaps impeding a magnetic flux of said magnet and controlling it so that it travels via at least the other of said magnetically non conductive gaps, said one magnetically non conductive gap being larger than said other magnetically non conductive gap.

19. A measuring instrument as defined in claim 15, wherein said at least one region of said axle and also said rotor are composed of soft magnetic material.

20. A measuring instrument as defined in claim 15, wherein said stator has a part with a projection into which said at least one region of said axle protrudes.

21. A measuring instrument for contactless determination of rotational movement of a component, comprising a rotor composed of a magnetically conductive material and connectable to a component; a stator arranged relative to said rotor so that an air gap is provided between said stator and said rotor, said stator being provided with at least one air gap; at least one magnetic field-sensitive material located in said at least one air gap of said rotor; at least one magnet having at least one portion arranged in said rotor, said stator being composed of a plurality of parts, at least one of said parts of said stator having no magnetically conductive connection to remaining parts of said stator so that a division of a magnetic flux of said magnetic takes place, at least a first part of said magnetic flux flowing through said magnetic field-sensitive element, said magnet being composed of a plurality of parts so that at least two parts of said magnet are connected to each other with an intermediate piece, so that there are at least two different exclusively ascending slopes in a measuring curve which does not have a change of sign.

* * * * *